No. 801,648. PATENTED OCT. 10, 1905.
J. H. CHANDLER.
PLUG VALVE.
APPLICATION FILED AUG. 3, 1904.
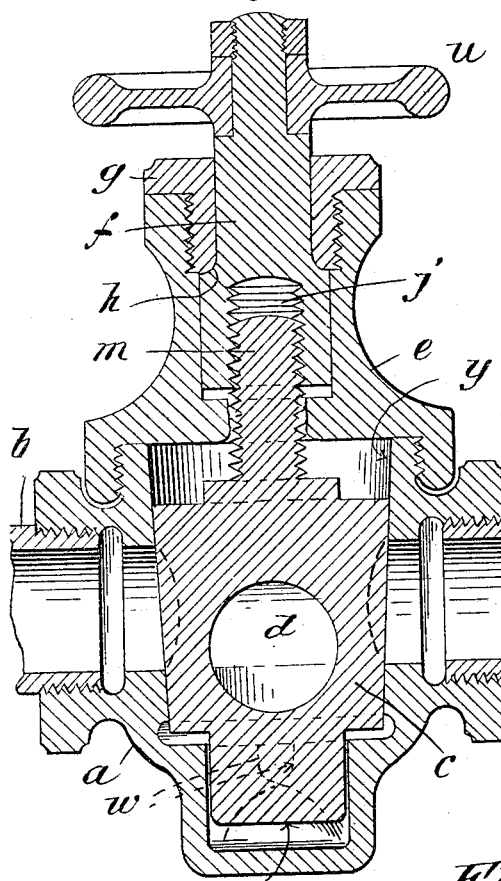
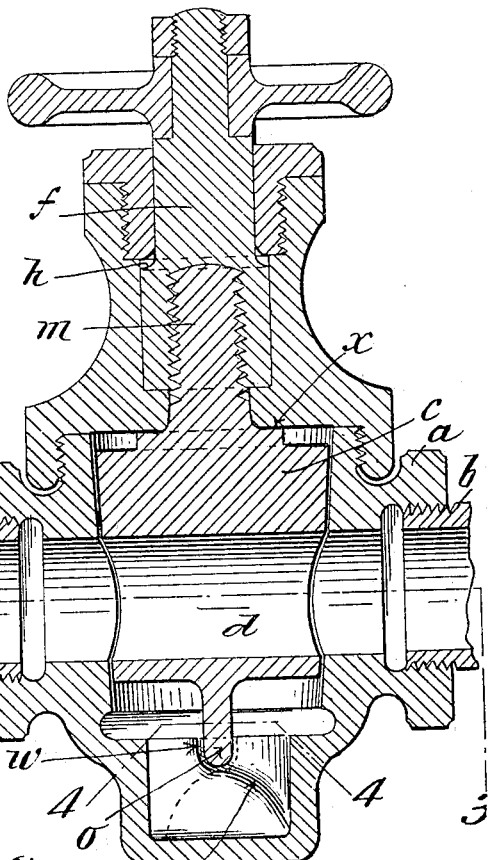
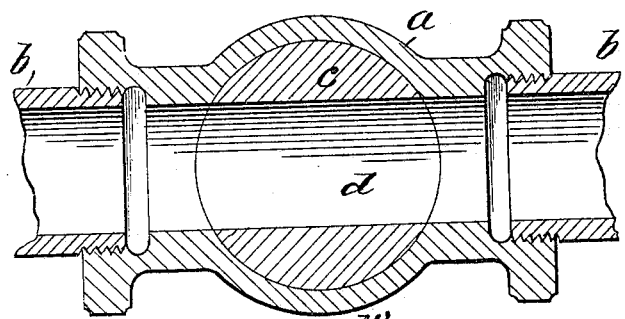
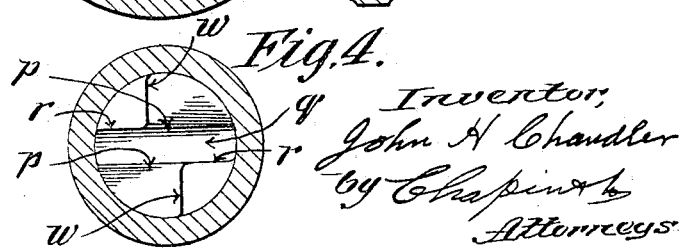
Witnesses: Inventor,
John H. Chandler
by Chapin &c
Attorneys

UNITED STATES PATENT OFFICE.

JOHN H. CHANDLER, OF SPRINGFIELD, MASSACHUSETTS.

PLUG-VALVE.

No. 801,648.      Specification of Letters Patent.      Patented Oct. 10, 1905.

Application filed August 3, 1904. Serial No. 219,391.

*To all whom it may concern:*

Be it known that I, JOHN H. CHANDLER, a citizen of the United States of America, residing at Springfield, (Indian Orchard,) in the county of Hampden and State of Massachusetts, have invented new and useful Improvements in Plug-Valves, of which the following is a specification.

This invention relates to valves, and especially to plug-valves. As is well known, the plugs in valves of this class are made round in cross-section and are tapered lengthwise and fit in a similarly-tapered seat in the valve-body and have a transversely-located opening registering when the valve is open with a transverse opening through the body. The fit of the plug in the body must be a close one to prevent leakage when the valve is closed, and the closeness of this fit causes the parts to wear and cut circumferentially, this wear being accelerated by dirty water.

The object of the present invention is to effect a loosening of the plug in its seat by raising it more or less before it can be rotated to open it and to rotate it during the closing movement before it can be seated, to the end that there may be no grinding action between the plug and its seat at the time when the plug is closely fitted therein.

A further object of the invention is to provide means whereby the hand-wheel on the stem may effect the opening of the valve directly, and means in the body may by the downward movement of the plug effect the closing of the valve.

In the drawings accompanying this application, Figure 1 is a sectional elevation of a valve embodying the invention. Fig. 2 is a similar view showing the valve open. Fig. 3 is a sectional plan view taken on line 3 3, Fig. 2; and Fig. 4 is a sectional plan view through the body of the valve on line 4 4, Fig. 2, showing means to rotate the plug during the closing movement of the latter.

Referring to the drawings, $a$ indicates the valve-body, having the usual oppositely-located openings therein into which the ends of a pipe $b$ are screwed. Between these openings the tapered valve-plug $c$ is fitted in the body, which plug is provided with a centrally-located hole $d$, which when the valve is open will be in registration with said openings, constituting a straight water-passage from one of said pipes to the other through the valve.

To the valve-body is fitted a cap $e$, in which is supported the freely-rotatable stem $f$, having no threaded engagement with the cap. The stem is made with an enlarged lower extremity which fits closely within a cavity in the cap, and the nut $g$, like a packing-nut, screws down into the cap and against the shoulder $h$, formed on the stem as a result of the enlargement of the lower end of the latter. Said lower end of the stem is bored out axially and screw-threaded, as indicated by $j$, and a stem $m$, fixed to or forming part of the plug $c$ and extending axially from the upper end thereof, is screwed into the end of said stem $f$, on the lower end of which is cast a downwardly-extending rib $o$. In the bottom of the valve-body there are cast two spirally-disposed abutments $p$, against which said rib $o$ will come in contact as the plug is forced downwardly and by reason of said contact will be rotated to locate the opening $d$ therethrough transversely to the axis of the pipes $b$.

The two spiral surfaces on the abutments $p$ are laid out around a vertical axis, one on each side of a slot or depression $q$, adapted to receive the rib $o$, and the faces of each of the abutments $p$ (which constitute opposite borders of a portion of said slot $q$) are vertically disposed, as indicated at $r$, and constitute a stop for the rib whereby the degree of rotation of the plug is limited.

The stem $f$ of the valve is provided with a hand-wheel $u$ or other convenient means for rotating it, and when this stem is rotated to screw onto the stem $m$ of the valve-plug the latter will be raised without necessarily being rotated until the end of the stem $m$ comes to a stop against the bottom of the hole $j$ in the stem $f$, as shown in Fig. 2. In this position the two parts of the stem will rotate as one in the direction necessary to screw the two stems together, and thus rotary movement will be imparted to the plug to bring it to the position shown in Fig. 2 ordinarily only after the two stems have come together, as shown in said figure. Of course if there were a very tight fit between the threaded portions of the two stems $f$ and $m$ it is conceivable that the plug might be rotated before being raised quite up to the position shown in Fig. 2; but in any event it could not be rotated while closely fitted in its tapered seat in the valve-body. Therefore under ordinary conditions of manufacture the plug will be raised, as shown in Fig. 2, and then rotated to open it.

As shown in the drawings, the upper ends of each of the spiral surfaces $p$ terminate in a vertically-disposed wall $w$, (clearly shown in the drawings,) which serve, as do the surfaces $r$ on the other side of the abutment, to limit the degree of rotary movement of the plug in the opposite direction.

The plug being in the position shown in Fig. 2, if the stem $f$ be turned to the left to close it the closing movement will take place as soon as the stem $m$ begins to separate from the stem $f$, for this separation crowds the rib $o$ against the two oppositely-disposed spiral surfaces of the abutments $p$ and effects the complete rotation of the plug through an arc of ninety degrees before the plug in its descending movement comes to a close fit in the body—that is to say, the plug will have a relatively loose fit in the body when it has been turned as far as possible in a closing direction—and the continued rotation of the stem $f$ at that time will force the plug downward to a close fit in the body, the bearing of the rib $o$ against the surfaces $r$ preventing further rotation of the plug on its axis.

As seen in Fig. 2, when the plug is screwed up as far as it will go the upper end thereof fits closely against the bottom of the cap, as at $x$, and thus shuts off the water from entering the threaded portion of the stems $f$ and $m$, and this fit, together with the close fit of the stem $f$ within the cap, renders all packing unnecessary.

That portion of the valve-body in which the plug is fitted and lying between the top of the plug and the under side of the cap when the plug is in a closed position is preferably made cylindrical to the end that the upper end of the plug fitting closely in said cylindrical portion (which may be indicated by $y$) will exclude water therefrom.

From the foregoing description it is clear that the stem $f$ will exert upon the opening movement thereof a direct pull on the plug to draw it away from its seat prior to rotating it, and upon the closing movement thereof it will force the plug downward against the spiral surfaces of the abutments $p$ to effect its complete rotation before the seating thereof in the body, and because of these characteristics all cutting between the valve-plug and the body will be obviated, as this cutting results from rotating the valve, while the latter is tightly seated in the body.

Having thus described my invention, what I claim, and desire to secure by Letters Patent of the United States, is—

1. The combination in a plug-valve of a body having a spirally-disposed projection therein, a plug, a stem connected with the plug and arranged to impart a rotary and a lifting movement thereto, and means of engagement between the plug and said projection to effect the rotation of the plug by the downward movement of the latter.

2. A plug-valve comprising a body, a tapered plug, a stem consisting of two parts, one of which extends outside the body and is revoluble in a substantially fixed plane, a stem on the plug having a screw engagement with the first-named stem to raise the plug to a seating position against the under side of the cap, and to rotate it in one direction.

3. A plug-valve comprising a body, a tapered plug, a stem consisting of two parts, one of which extends outside the body and is revoluble in a substantially fixed plane, a stem on the plug having a screw engagement with the first-named stem whereby the latter, when turned in one direction, will raise the plug to a seat against the under side of the cap in the body, the plug rotating with the stem, the rotation of the latter in the opposite direction imparting vertical movements only to said plug together with a device to effect the rotation of the plug during said vertical movement.

JOHN H. CHANDLER.

Witnesses:
H. A. CHAPIN,
K. I. CLEMONS.